(12) United States Patent
Ranellucci

(10) Patent No.: US 11,431,490 B1
(45) Date of Patent: Aug. 30, 2022

(54) SYSTEM AND METHOD FOR SECURING DATA IN A QUANTUM COMPUTING ENVIRONMENT USING MULTI-PARTY COMPUTATION

(71) Applicant: Coinbase IL RD Ltd., Oakland, CA (US)

(72) Inventor: Samuel Ranellucci, Tel Aviv (IL)

(73) Assignee: Coinbase IL RD Ltd., Oakland, CA (US)

( * ) Notice: Subject to any disclaimer, the term of this patent is extended or adjusted under 35 U.S.C. 154(b) by 0 days.

(21) Appl. No.: 17/518,652

(22) Filed: Nov. 4, 2021

(51) Int. Cl.
*H04L 9/08* (2006.01)
*H04L 9/32* (2006.01)

(52) U.S. Cl.
CPC ........... *H04L 9/0852* (2013.01); *H04L 9/085* (2013.01); *H04L 9/0825* (2013.01); *H04L 9/3228* (2013.01); *H04L 9/3247* (2013.01)

(58) Field of Classification Search
CPC ..... H04L 9/0852; H04L 9/0825; H04L 9/085; H04L 9/3228; H04L 9/3247
See application file for complete search history.

(56) References Cited

U.S. PATENT DOCUMENTS

| | | | | |
|---|---|---|---|---|
| 9,692,595 | B2* | 6/2017 | Lowans | H04L 9/0838 |
| 2010/0169651 | A1* | 7/2010 | Scheidt | H04L 9/3231 |
| | | | | 713/176 |
| 2017/0054556 | A1* | 2/2017 | Fu | H04L 9/3226 |
| 2018/0181756 | A1* | 6/2018 | Campagna | H04L 9/0877 |
| 2018/0309571 | A1* | 10/2018 | Arora | H04L 9/0858 |
| 2019/0155959 | A1* | 5/2019 | Lee | G06F 3/0638 |
| 2020/0044863 | A1* | 2/2020 | Yadlin | H04L 9/085 |
| 2020/0175138 | A1* | 6/2020 | Nordstrom | G06F 21/105 |

OTHER PUBLICATIONS

Villanyi, Viktoria "Promising One-time Signature Schemes (Survey)", Nov. 18-20, 2010, 11th IEEE International Symposium on Computational Intelligence and Informatics, p. 1-6.*

* cited by examiner

*Primary Examiner* — Christopher A Revak
(74) *Attorney, Agent, or Firm* — Perkins Coie LLP

(57) ABSTRACT

A computerized system and method for obtaining a post-quantum security scheme, generating a one-time use signing key split into shares, each share of the one-time use signing key is stored in one computerized device of the multiple computerized devices, generating shares of a verification key using a function receiving a share of the signing key, generating a data structure, where each node of the data structure is associated with a share of the verification key, signing a message using the shares of the one-time use signing key, revealing the share of the verification key, and reconstructing at least a portion of the data structure to validate that the revealed share of the verification key is associated with the correct node of the data structure.

20 Claims, 4 Drawing Sheets

SYSTEM AND METHOD FOR SECURING DATA IN A QUANTUM COMPUTING ENVIRONMENT USING MULTI-PARTY COMPUTATION

FIELD

The invention generally relates to securing data in a quantum computing environment.

BACKGROUND

Quantum computing is the use of quantum phenomena such as superposition and entanglement to perform computations. Computers, and other electronic devices, that perform quantum computations, are known as quantum computers. With the development of quantum computing, some cryptosystems may become vulnerable to a quantum adversary who has a quantum computer that can compromise security, for example, by solving an integer factoring or a discrete log problem in polynomial time The current batch of asymmetric cryptographic algorithms deployed on a large-scale on the internet are insecure against quantum computers. As a result, a set of new signature schemes have been constructed that are secure against quantum computers. A signature scheme is defined as post-quantum if it is secure against quantum computers.

A threshold signature scheme is a signature scheme where the secret signing key is distributed (shared) among a set of players, and a message can only be signed if a quorum of parties consents to sign the message.

Authenticated secret sharing is a method of splitting a secret so that no player can provide an incorrect MPC share to a MPC computation that uses those shares. Roughly, to do authenticated sharing, one has to authenticate the secret using a message authentication code (MAC) where the keys and the tags of the MAC are shared between the two parties.

There is a technical need to provide a post-quantum threshold signing scheme that is secure against a quantum adversary.

SUMMARY

In one aspect of the invention a system is provided including multiple computerized devices, each of the devices including a processing system of a device including one or more processors, and a memory system including one or more computer-readable media, where the one or more computer-readable media contain instructions that, when executed by the processing system, cause the processing system to perform operations including obtaining a post-quantum secure signature scheme, generate a one-time use signing key split into shares, each share of the one-time use signing key is stored in one computerized device of the multiple computerized devices, generating shares of a verification key using a function receiving a share of the signing key, generating a Merkle tree data structure, where each node of the Merkle tree is associated with a share of the verification key, signing a message using the shares of the one-time use signing key, the computerized device of the multiple computerized devices reveals the share of the verification key, reconstructing at least a portion of the Merkle tree to validate that the revealed share of the verification key is associated with the correct node of the Merkle tree.

In some cases, the message is signed using a hash-based signature scheme using the one-time signing key. In some cases, the message is signed by performing a one-time signature using shares of precomputed values stored in each party.

In some cases, each computerized device of the multiple computerized devices generates one share of the verification key. In some cases, a root of the Merkle tree is a public key used by the multiple computerized devices. In some cases, the instructions comprising generating a digest based on the message, and where signing the message comprises signing the digest based on the message.

In some cases, each computerized device of the multiple computerized devices storing an index associated with a number of signing processes performed by the system, where incrementing the index in all the multiple computerized devices after signing the message. In some cases, the instructions comprising verifying the signature of the message.

BRIEF DESCRIPTION OF THE DRAWINGS

The invention may be more clearly understood upon reading of the following detailed description of non-limiting exemplary embodiments thereof, with reference to the following drawings, in which.

Figure 1:
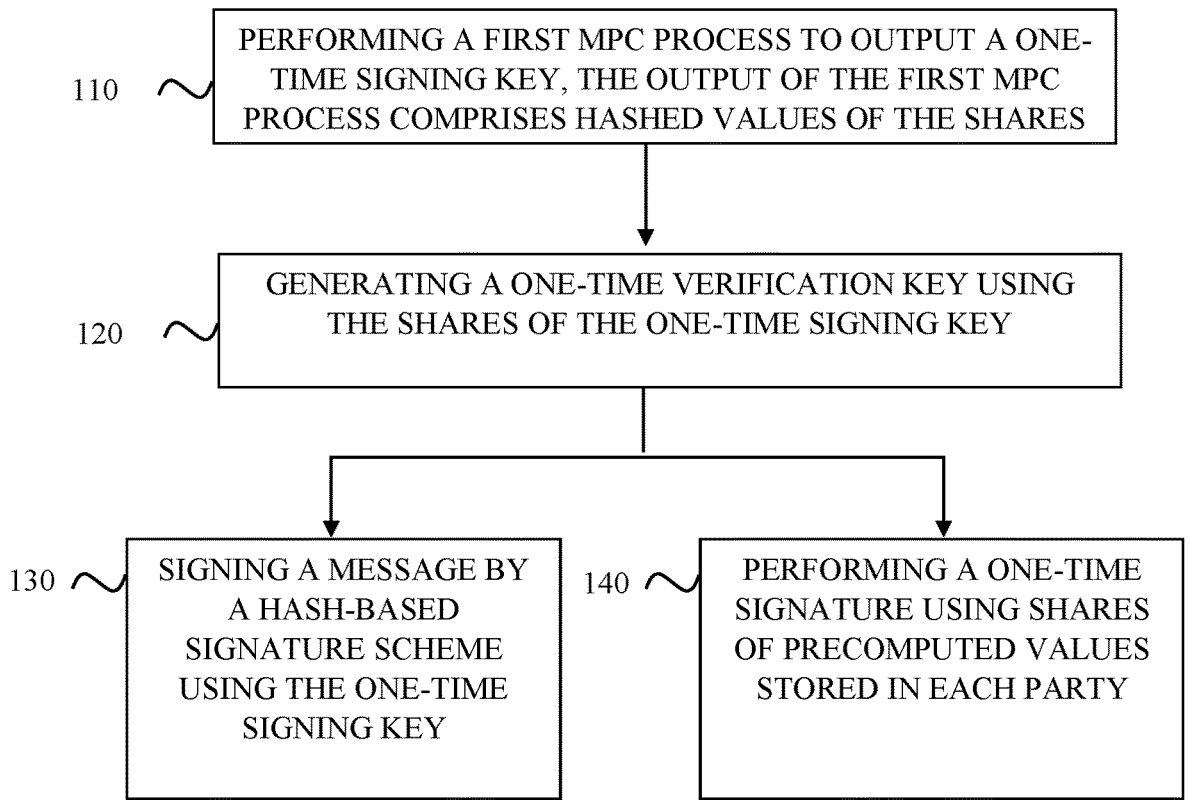
FIG. 1 discloses method signing a message using a one-time signature scheme, according to exemplary embodiments of the invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a system and method for signing multiple messages using a single signing scheme. For simplicity only, the signing scheme may be eXtended Merkle Signature Scheme (XMSS) or any other signing scheme that can perform the processes disclosed below. The method may comprise a pre-computation phase, in which part of the signatures are computed, in order to save time. In this exemplary embodiment, the parties reveal shares of the key. In case the target is to reduce memory consumption, the method may comprise storing part of the signatures, thereby requiring the parties to perform a signing MPC process to sign the messages. Divide the message into nibbles, each nibble has a value and index, and hashing the corresponding signing key according to the value of the nibble, for example running the hashing process N times, according to the index of the corresponding nibble. The signature is the set of partial signatures, each partial signature is created and stored in a separate party. Each partial signature is created by applying hash processes on the signing key. Once you have a nibble index, you compute the hash according to the index on both sides, and concatenate the shares of the hash. When you add them together, this is the signature.

The signing process is performed using, at least in part, a multi-party computation (MPC) process in which multiple parties first hold shares of a secret. The shares are inputted into a first MPC process in which the multiple parties exchange information without revealing the content of the shares to the other party. The output of the first MPC process is shares of a one-time signing key stored in the multiple parties, each share in a single party. In some cases, the first MPC process also includes hashing the shares of the one-time signing key using a hash function, such that the shares stored in the parties are hashed values of the shares of the one-time signing key. Then, the method includes generating a one-time verification key using the shares of the one-time signing key. The verification key may be used to generate a Merkle tree used to verify the result of the signature. Then, the method includes signing the message using the one-time signing key or using a one-time signature scheme.

The method enables to protect the seed using authenticated shares. This prevents the adversary from tampering with the shares and ensures that information about the seed is not leaked. The method also enables to perform only operations that are needed for security inside MPC, hence reduce the computational cost of those operations. Splitting the secret into shares enables to significantly reduce the MPC cost of generating signatures at runtime. Essentially, the correct share can be based on the digest to be signed. In addition, the shares do not need to be verified since the signature is verified. In addition, under the assumption that the hash function is collision resistant, the generation of the randomness r can be done without using MPC. Further, the method can sign the message considering a memory-time tradeoff, thereby storing less shares at the cost that needed to do more computations.

The term "party" as defined below may be a computerized device such as a server, a laptop, a tablet computer, a virtual machine, a smartphone and the like, as long as it has a processor, a memory and the ability to exchange information with the other parties.

FIG. 1 discloses method signing a message using a one-time signature scheme, according to exemplary embodiments of the invention. Using the process below, the one-time signature scheme is used to instantiate a scheme to sign multiple messages.

Step 110 discloses performing a first MPC process to output a one-time signing key. The output of the first MPC process includes shares of a signing key stored in each party. The shares of the signing key may be hashed, meaning that a hash function received the shares as input. During the first MPC process, the parties exchange information over a communication network or channel, such that none of the parties has access to the entire signing key or to a share of the signing key stored in another party.

Step 120 discloses generating a one-time verification key using the shares of the one-time signing key. The one-time verification key may be generated using an MPC process and then stored locally on each party. For example, by applying a known function on the share of the signing key. The known function may be a hash function, or another irreversible function. When signing a single message using the method of this embodiment, the parties generate a one-time signing key that is associated to a single one-time verification key. This one-time verification key is a node at the bottom of the Merkle tree. If a party stores the one-time verification keys generated during one-time signing key generation there is no need to reconstruct the verification keys.

Step 130 discloses signing the message by a hash-based signature scheme using the one-time signing key. Signing the message may be performed on the message itself or on a digest of the message. The implementation of step 130 is optional and requires a second multi-party computation (MPC) process between the parties, based on the shares of the signing key, without enabling one of the parties, or another entity, access to the entire signing key. The output of the second MPC process is the signed message (Q: where is it stored?).

Step 140 discloses signing the message by performing a one-time signature using shares of precomputed values stored in each party. This step is an alternative implementation to the second MPC process disclosed in step 130. Signing the message may be performed on the message itself or on a digest of the message. The preprocessing includes performing an MPC process to generate shares of hashed values.

Figure 2:
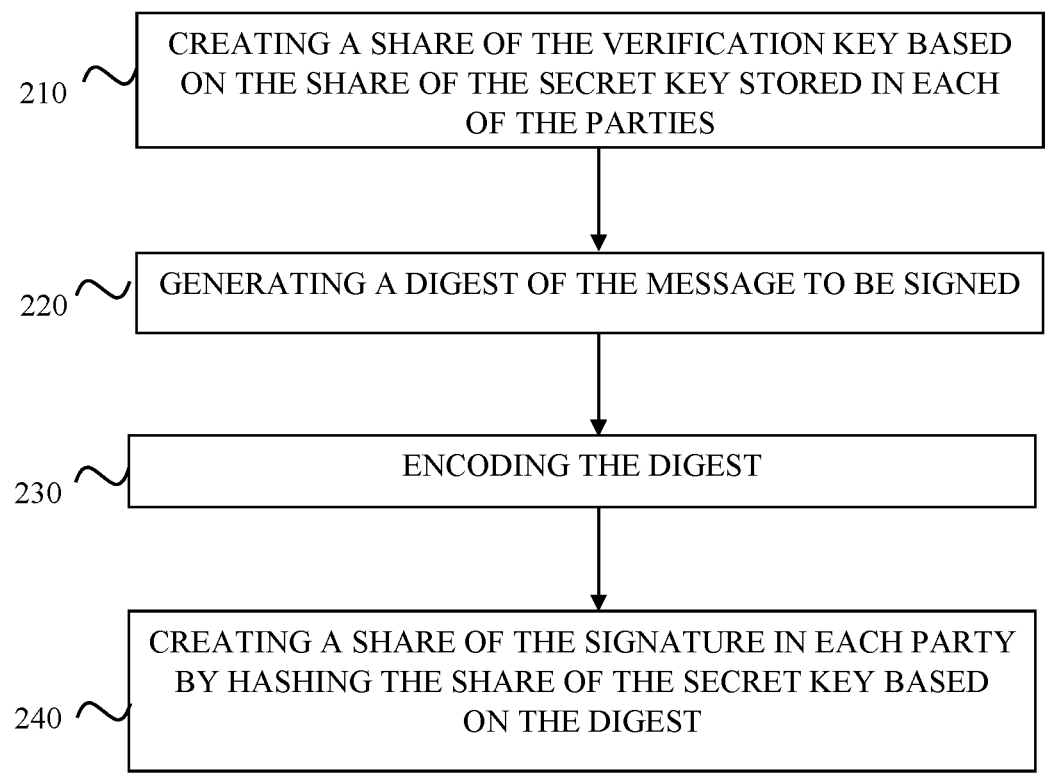
FIG. 2 discloses method for constructing a one-time signature, according to exemplary embodiments of the invention.

FIG. 2 discloses method for constructing a one-time signature, according to exemplary embodiments of the invention.

Step 210 discloses creating a share of the verification key based on the share of the secret key stored in each of the parties. Each of the parties may create the share of the verification key locally.

Step 220 discloses generating a digest of the message to be signed. The digest may be generated by applying a one way hashing algorithm on the encrypted message.

Step 230 discloses encoding the digest. Encoding the digest may be performed using one or more encoding schemes, the one or more encoding schemes including at least redundancy coding. The encoded digest is split and stored in the multiple parties. In some cases, encoding the digest may be performed using an MPC process, such that none of the multiple parties obtains the entire encoded digest.

Step 240 discloses creating a share of the signature in each party by hashing the share of the secret key based on the digest. In some cases, the hash function is executed a different number of times in each party. The number of hashes may depend on the encoded digest.

Figure 3:
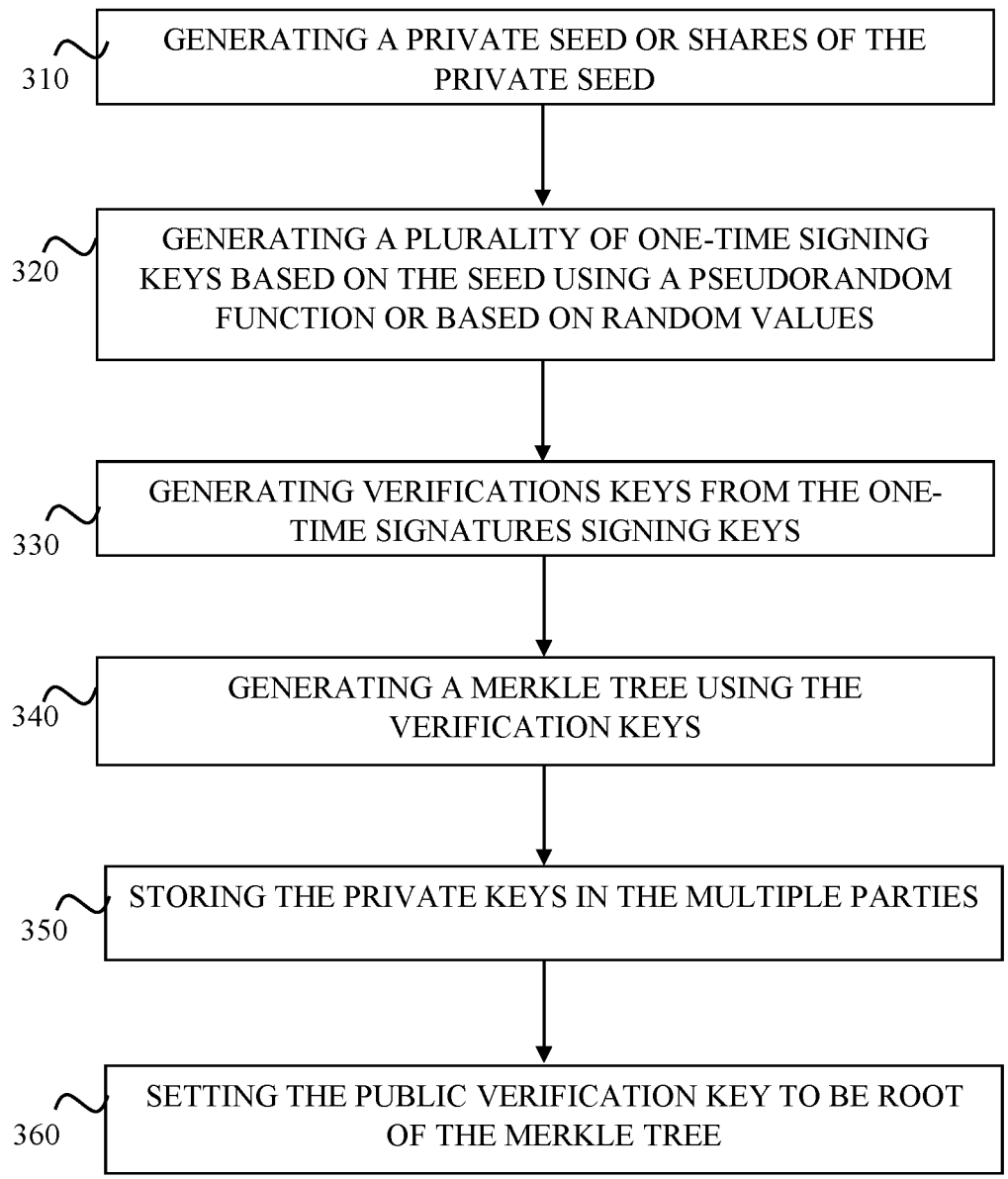
FIG. 3 discloses method for generating a signing key on a hash-based signing scheme, according to exemplary embodiments of the invention.

FIG. 3 discloses method for generating a signing key on a hash-based signing scheme, according to exemplary embodiments of the invention. The hash-based signing scheme may comprise a hash-based tree, for example a Merkle tree.

Step 310 discloses generating a private seed or shares of the private seed. When using multiple shares, each share may be stored in another separate party. Generating the private seeds is optional, as the signing keys may also be generated based on random values.

Step 320 discloses generating a plurality of one-time signing keys. The one-time signing keys may be generated based on the seed using a pseudorandom function or based on random values, in case step 310 was not performed.

Step 330 discloses generating verifications keys from the one-time signatures signing keys. The verification key is generated as shares, not in its entirety. The verification key is not accessed by a single party throughout the entire signing process. At the end of generating the verification key, each party obtains a share of the verification key. The shares of the verification key may be computed locally by each party by applying a function receiving the share of the signing key as input. The function may be a hash function, or another irreversible function.

Step 340 discloses generating a Merkle tree using the shares of the verification key. The Merkle tree is an example of a hash-tree, defined as a Tree-like data structure in which every leaf node is labelled with the cryptographic hash of a data block, and every non-leaf node is labelled with the cryptographic hash of the labels of its child nodes. The nodes of the Merkle tree are associated with shares of the verification key as provided from each party. All the multiple parties store the Merkle tree in their memory. The Merkle tree is implemented as a tree-like data structure as known in the art.

Step 350 discloses storing the private keys in the multiple parties. The method utilizes multiple private one-time signing keys, each of which is used to sign a single a single message.

Step 360 discloses setting the public verification key to be root of the Merkle tree. This may be performed before using the Merkle tree to sign messages. At least one of the parties stores the Merkle tree with the public verification key as root. One party, acting as coordinator, may store the tree and update the tree based on information received from the other parties.

Figure 4:
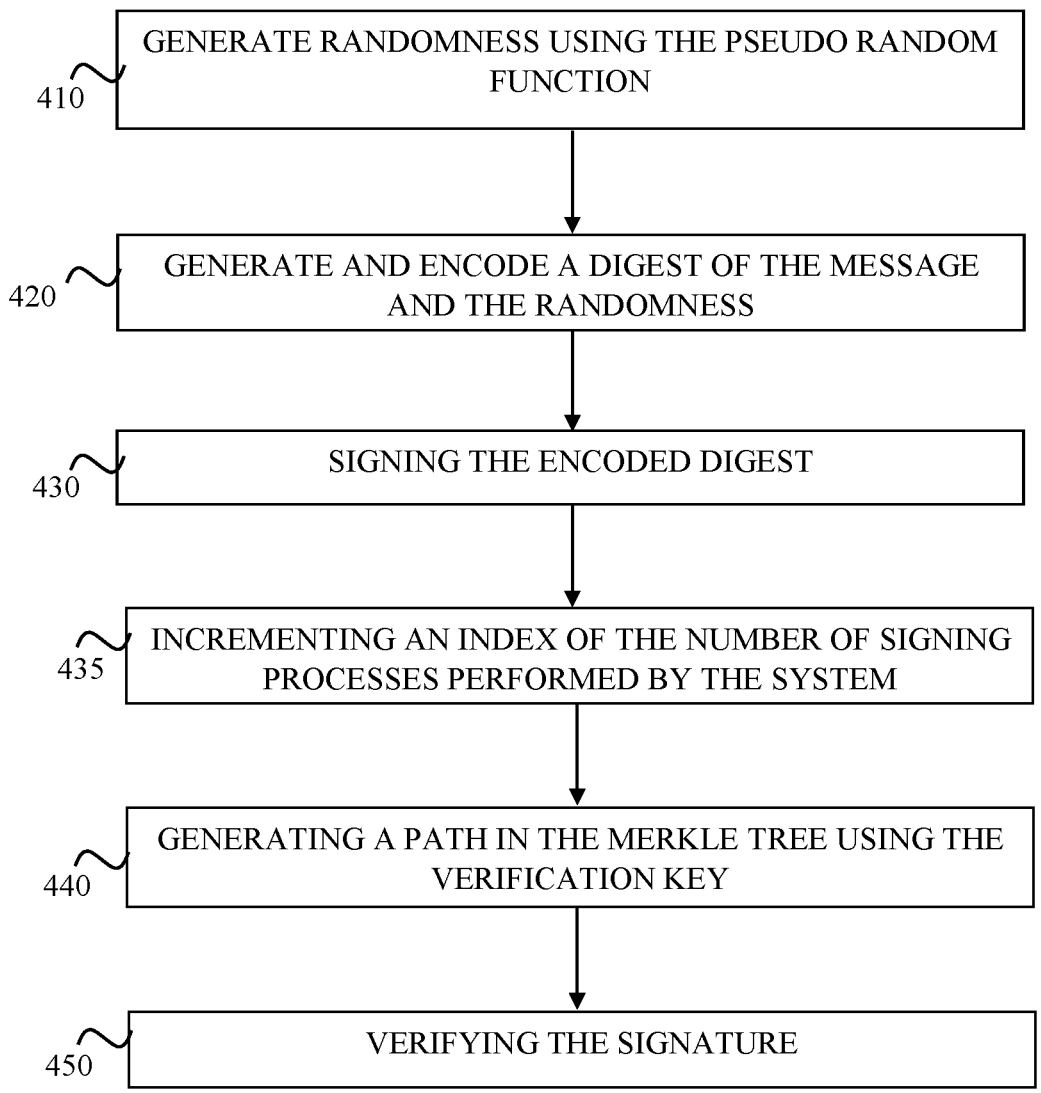
FIG. 4 discloses method for signing a message using a hash-based signing scheme, according to exemplary embodiments of the invention.

FIG. 4 discloses method for signing a message using a hash-based signing scheme, according to exemplary embodiments of the invention.

Step 410 discloses generating randomness using a pseudo random function. In cryptography, a pseudorandom function family (PRF), is a collection of efficiently-computable functions which emulate a random oracle in the following way: no efficient algorithm can distinguish (with significant advantage) between a function chosen randomly from the PRF family and a random oracle (a function whose outputs are fixed completely at random). A pseudorandom function family can be constructed from any pseudorandom generator, using, for example, the "GGM" construction given by Goldreich, Goldwasser, and Micali.

Step 420 discloses generating and encoding a digest of the message and the randomness. The digest may be generated by applying a one way hashing algorithm on the encrypted message. Encoding the digest may be performed using one or more encoding schemes, the one or more encoding schemes including at least redundancy coding. The encoded is split and stored in the multiple parties. In some cases, encoding the digest may be performed using an MPC process, such that none of the multiple parties obtains the entire encoded digest.

Step 430 discloses signing the encoded digest. Signing the message may be performed by a hash-based signature scheme using the one-time signing key. Signing the message may be implemented by performing a one-time signature using shares of precomputed values stored in each party.

Step 435 discloses incrementing an index of the number of signing processes performed by the system. The index is used to identify a node in the Merkle tree. The index is stored in the memory of all the parties. The index is used to verify that the Merkle tree is reconstructed in the same way in all the parties. For example, verifying that node #5 is added in all the parties after signing a specific message.

Step 440 discloses generating a path in the Merkle tree using the verification key. The path is added to a data structure stored in each of the multiple parties. The path includes multiple nodes determined by the index of the signature. Each node at the bottom of the tree is associated to a unique index. The path of a specific index may be represented as the path taken to return the root of the tree. The path can be computed locally from the index. For example, denote left=0, and right=1, the path is the binary representation of the index.

Step 450 discloses verifying the signature. verifying may be performed by performing an MPC process that receives the private keys of the one-time signing key associated to given index, without revealing the private keys to other parties. The output of the MPC process is signing the given digest using a specific one-time signing key associated with the message used to generate the digest. The parties then reveal the nodes on the path of the tree and the one-time verification key associated to the given index. The verifier uses the one-time verification key to verify the one-time signature key. The verifier also verifies that the path matches the given index and the root node of the Merkle tree.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed herein.

What is claimed is:

1. A system for providing a post-quantum security scheme comprising, the system comprising multiple computerized devices, wherein each of the devices comprises:
   a processing system of a device comprising one or more processors; and
   a memory system comprising one or more computer-readable media, wherein the one or more computer-readable media contain instructions that, when executed by the processing system, cause the processing system to perform operations comprising:
      generating a one-time use signing key that is split into shares, wherein each share of the one-time use signing key is stored in one computerized device of the multiple computerized devices;
      generating a verification key using a function receiving a share of the signing key;
      generating a data structure, wherein each node of the data structure is associated with a share of the verification key;
      signing a message using the shares of the one-time use signing key, wherein the computerized device of the multiple computerized devices reveals the share of the verification key; and
   validating that the revealed share of the verification key is associated with the correct node of the data structure.

2. The system of claim 1, wherein signing the message is performed using a hash-based signature scheme using the one-time signing key.

3. The system of claim 1, wherein signing the message is performed using a one-time signature based on each share of the one-time use signing key stored in one computerized device of the multiple computerized devices.

4. The system of claim 1, wherein each computerized device of the multiple computerized devices generates one share of the verification key.

5. The system of claim 1, wherein the data structure is a Merkle tree, and wherein at least a portion of the Merkle tree is reconstructed when validating that the revealed share of the verification key is associated with the correct node of the data structure.

6. The system of claim 5, wherein a root of the Merkle tree is a public key used by the multiple computerized devices.

7. The system of claim 1, wherein comprising generating a digest based on the message, and wherein signing the message comprises signing the digest based on the message.

8. The system of claim 1, wherein each computerized device of the multiple computerized devices stores an index associated with a number of signing processes performed by the system, and wherein the index is incremented in all the multiple computerized devices after signing the message.

9. The system of claim 1, further comprising verifying the signature of the message.

10. A method comprising multiple computerized devices, the method comprising:
- generating a one-time use signing key that is split into shares, wherein each share of the one-time use signing key is stored in one computerized device of the multiple computerized devices;
- generating a verification key using a function receiving a share of the signing key;
- generating a data structure, wherein each node of the data structure is associated with a share of the verification key;
- signing a message using the shares of the one-time use signing key, wherein the computerized device of the multiple computerized devices reveals the share of the verification key; and
- validating that the revealed share of the verification key is associated with the correct node of the data structure.

11. The method of claim 10, wherein signing the message is performed using a hash-based signature scheme using the one-time signing key.

12. The method of claim 10, wherein signing the message is performed using a one-time signature based on each share of the one-time use signing key stored in one computerized device of the multiple computerized devices.

13. The method of claim 10, wherein each computerized device of the multiple computerized devices generates one share of the verification key.

14. The method of claim 10, wherein the data structure is a Merkle tree, and wherein at least a portion of the Merkle tree is reconstructed when validating that the revealed share of the verification key is associated with the correct node of the data structure.

15. The method of claim 14, wherein a root of the Merkle tree is a public key used by the multiple computerized devices.

16. The method of claim 10, wherein comprising generating a digest based on the message, and wherein signing the message comprises signing the digest based on the message.

17. The method of claim 10, wherein each computerized device of the multiple computerized devices stores an index associated with a number of signing processes performed by the system, and wherein the index is incremented in all the multiple computerized devices after signing the message.

18. The method of claim 10, further comprising verifying the signature of the message.

19. A non-transitory, computer-readable medium having instructions recorded thereon, that when executed by one or more processors, causes operations comprising:
- generating a one-time use signing key that is split into shares, wherein each share of the one-time use signing key is stored in one computerized device of the multiple computerized devices, wherein each computerized device of the multiple computerized devices generates one share of the verification key;
- generating a verification key using a function receiving a share of the signing key;
- generating a data structure, wherein each node of the data structure is associated with a share of the verification key;
- signing a message using the shares of the one-time use signing key, wherein the computerized device of the multiple computerized devices reveals the share of the verification key, wherein signing the message is performed using a one-time signature based on each share of the one-time use signing key stored in one computerized device of the multiple computerized devices; and
- validating that the revealed share of the verification key is associated with the correct node of the data structure.

20. The non-transitory, computer-readable medium of claim 19, wherein signing the message is performed using a hash-based signature scheme using the one-time signing key.

* * * * *